US011913469B2

(12) United States Patent
Gao

(10) Patent No.: US 11,913,469 B2
(45) Date of Patent: Feb. 27, 2024

(54) AXIAL FLOW FAN, AIR CONDITIONER OUTDOOR UNIT AND AIR CONDITIONER

(71) Applicants: GD MIDEA AIR-CONDITIONING EQUIPMENT CO., LTD., Foshan (CN); MIDEA GROUP CO., LTD., Foshan (CN)

(72) Inventor: Wendong Gao, Foshan (CN)

(73) Assignees: GD MIDEA AIR-CONDITIONING EQUIPMENT CO., LTD., Foshan (CN); MIDEA GROUP CO., LTD., Foshan (CN)

( * ) Notice: Subject to any disclaimer, the term of this patent is extended or adjusted under 35 U.S.C. 154(b) by 31 days.

(21) Appl. No.: 17/577,705

(22) Filed: Jan. 18, 2022

(65) Prior Publication Data

US 2022/0136522 A1 May 5, 2022

Related U.S. Application Data

(63) Continuation of application No. PCT/CN2019/101734, filed on Aug. 21, 2019.

(30) Foreign Application Priority Data

Jul. 23, 2019 (CN) ......................... 201921166355.2
Jul. 23, 2019 (CN) ......................... 201921169879.7

(51) Int. Cl.
*F04D 29/32* (2006.01)
*F04D 19/00* (2006.01)
(Continued)

(52) U.S. Cl.
CPC ......... *F04D 29/329* (2013.01); *F04D 19/002* (2013.01); *F04D 29/053* (2013.01);
(Continued)

(58) Field of Classification Search
None
See application file for complete search history.

(56) References Cited

U.S. PATENT DOCUMENTS 5,871,335 A * 2/1999 Bartlett ................ F04D 29/329 416/169 A
6,004,097 A 12/1999 Wark et al.
(Continued)

FOREIGN PATENT DOCUMENTS

CN 203717440 U 7/2014
CN 203962505 U 11/2014
(Continued)

OTHER PUBLICATIONS

Oguri M—JP-2017141729-A and machine translation (Year: 2017).*
(Continued)

*Primary Examiner* — Juan G Flores
(74) *Attorney, Agent, or Firm* — Anova Law Group, PLLC

(57) ABSTRACT

An axial flow fan includes an axial flow impeller, a motor configured to drive the axial flow impeller to rotate, and a resistance member. The axial flow impeller includes a hub having a shaft hole and blades arranged at an outer peripheral wall of the hub. The motor includes a motor body and a motor shaft connected to the motor body and engaged in the shaft hole. The resistance member is arranged at the hub and close to a free end of the motor shaft. A stiffness of the resistance member is greater than a stiffness of the hub.

20 Claims, 7 Drawing Sheets

A

(51) Int. Cl.
*F04D 29/053* (2006.01)
*F04D 29/26* (2006.01)
*F04D 29/66* (2006.01)

(52) U.S. Cl.
CPC .......... *F04D 29/263* (2013.01); *F04D 29/661* (2013.01); *F05D 2260/38* (2013.01)

(56) References Cited

U.S. PATENT DOCUMENTS

| | | | | |
|---|---|---|---|---|
| 6,196,802 | B1 * | 3/2001 | Matsumoto | F04D 29/263 415/216.1 |
| 2001/0007633 | A1 | 7/2001 | Brioude et al. | |
| 2011/0206521 | A1 * | 8/2011 | Horng | F04D 29/263 416/204 R |

FOREIGN PATENT DOCUMENTS

| | | | |
|---|---|---|---|
| CN | 205779819 | U | 12/2016 |
| CN | 108869394 | A | 11/2018 |
| CN | 208918906 | U | 5/2019 |
| EP | 3441562 | A1 | 2/2019 |
| JP | 2017141729 | A | 8/2017 |

OTHER PUBLICATIONS

The European Patent Office (EPO) Extended Search Report for EP Application No. 19938280.5 dated Aug. 10, 2022 8 Pages.
World Intellectual Property Organization (WIPO) International Search Report for PCT/CN2019/101734 dated Mar. 27, 2020 7 Pages (Translation Included).

* cited by examiner

AXIAL FLOW FAN, AIR CONDITIONER OUTDOOR UNIT AND AIR CONDITIONER

CROSS-REFERENCE TO RELATED APPLICATIONS

This application is a continuation of International Application No. PCT/CN2019/101734, filed on Aug. 21, 2019, which claims priority to Chinese Patent Application Nos. 201921166355.2 and 201921169879.7, both filed on Jul. 23, 2019, the entire contents of all of which are incorporated herein by reference.

TECHNICAL FIELD

The present disclosure relates to the field of air treatment devices and, more particularly, to an axial flow fan, an air conditioner outdoor unit, and an air conditioner.

BACKGROUND

For axial flow impellers in the related art, blades thereof are usually thinned or other solutions are adopted to reduce the weight of an impeller and hence reduce the load of a motor. The impeller and a motor shaft are positioned with respect to each other via cooperation between the motor shaft and a hub and are tightened via a locknut. The impeller may have an increased resistance due to the reduced mass thereof, and the blades are subjected to different axial forces during the rotation of the impeller, such that the impeller may operate in an unbalanced state. In addition, since the axial flow impeller has poor performance against unbalanced excitation, the motor shaft may be subjected to great unbalanced excitation, which in turn results in the unbalance of the motor, thereby causing the motor to produce a lot of noise.

SUMMARY

The present disclosure aims at solving at least one of the technical problems in the related art. In this regard, the present disclosure provides an axial flow fan, which generates less noise during operation.

The present disclosure further provides an air conditioner outdoor unit including the above axial flow fan.

The present disclosure further provides an air conditioner including the above air conditioner outdoor unit.

According to embodiments in a first aspect of the present disclosure, an axial flow fan is provided. The axial flow fan includes: an axial flow impeller including a hub and blades arranged at an outer peripheral wall of the hub, the hub having a shaft hole; a motor configured to drive the axial flow impeller to rotate, including a motor body and a motor shaft connected to the motor body, wherein the motor shaft is engaged in the shaft hole; and a resistance member arranged at the hub and close to a free end of the motor shaft. A stiffness of the resistance member is greater than a stiffness of the hub.

In the axial flow fan according to the present disclosure, by arranging the resistance member on the hub and close to the free end of the motor shaft and setting the stiffness of the resistance member to be greater than the stiffness of the hub, the unbalanced excitation of the motor shaft can be reduced, thereby lowering the noise generated by the axial flow fan during operation.

According to some embodiments of the present disclosure, the stiffness of the resistance member is greater than a stiffness of the motor shaft.

According to some embodiments of the present disclosure, the resistance member is a metallic member or a ceramic member.

According to some embodiments of the present disclosure, the stiffness of the resistance member has a value ranging from $0.8\times10^7$ N/m to $1.5\times10^7$ N/m.

According to some embodiments of the present disclosure, the resistance member is annular and sleeved on an outer peripheral side of the motor shaft.

Further, an annular mounting groove is formed in an inner peripheral wall of the shaft hole, and the resistance member is accommodated in the mounting groove.

Further, the mounting groove penetrates an end surface of the hub close to the free end of the motor shaft along an axial direction.

Optionally, an end surface of the resistance member close to the free end of the motor shaft is flush with the end surface of the hub close to the free end of the motor shaft.

Optionally, the axial flow fan includes a locknut connected to the free end of the motor shaft through threads; and the locknut is arranged at a side of the resistance member close to the free end of the motor shaft, and abuts against the resistance member.

Optionally, the resistance member and the locknut are formed in one piece.

Optionally, a projection of the locknut on a reference surface is a first projection, a projection of the resistance member on the reference surface is a second projection, an outer contour of the first projection is located within an outer contour of the second projection, and the reference surface is perpendicular to a central axis of the motor shaft.

Optionally, an inner peripheral wall of the resistance member is spaced apart from an outer peripheral wall of the motor shaft.

Optionally, a length of the resistance member in an axial direction of the motor shaft ranges from 3 mm to 6 mm.

According to some embodiments of the present disclosure, the resistance member is embedded in the hub through injection molding.

According to embodiments in a second aspect of the present disclosure, an air conditioner outdoor unit is provided. The air conditioner outdoor unit includes the axial flow fan according to embodiments in the first aspect.

According to the air conditioner outdoor unit of the present disclosure, by arranging the axial flow fan, the noise generated during the operation of the air conditioner outdoor unit is lowered.

According to embodiments in a third aspect of the present disclosure, an air conditioner is provided. The air conditioner includes an air conditioning indoor unit and the air conditioner outdoor unit according to embodiments in the second aspect.

According to the air conditioner of the present disclosure, by arranging the air conditioner outdoor unit, the noise generated during the operation of the air conditioner is lowered.

Additional aspects and advantages of the present disclosure will be provided at least in part in the following description, or become apparent at least in part from the following description, or can be learned from practicing of the present disclosure.

BRIEF DESCRIPTION OF DRAWINGS

The above and/or additional aspects and advantages of the present disclosure will be described and explained by means of the following description of embodiments in conjunction with the accompanying drawings, in which.

Figure 1:
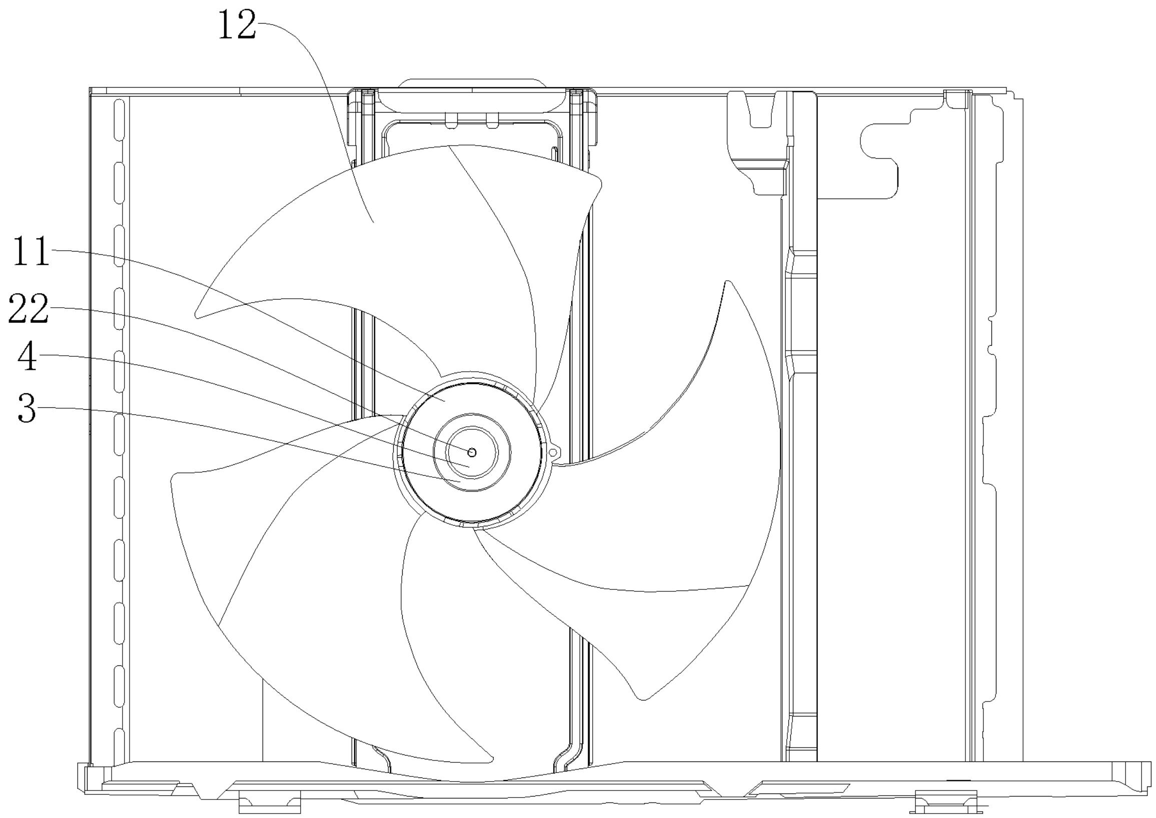
FIG. 1 is a partial structural diagram of an air conditioner outdoor unit according to some embodiments of the present disclosure.

Reference numerals in the accompanying drawings:

Axial flow fan 100;

Axial flow impeller 1; hub 11; blade 12;

Motor 2; motor body 21; motor shaft 22; free end 221;

Resistance member 3;

Locknut 4;

Elastic buffering member 5; first buffer 51; second buffer 52.

DESCRIPTION OF EMBODIMENTS

The embodiments of the present disclosure will be described in detail below with reference to examples thereof as illustrated in the accompanying drawings, throughout which the same or similar elements or the elements having same or similar functions are denoted with the same or similar reference numerals. The embodiments described below with reference to the drawings are illustrative only, and are intended to explain, rather than limiting, the present disclosure.

An axial flow fan 100 according to embodiments of the present disclosure will be described below with reference to the accompanying drawings.

Figure 2:
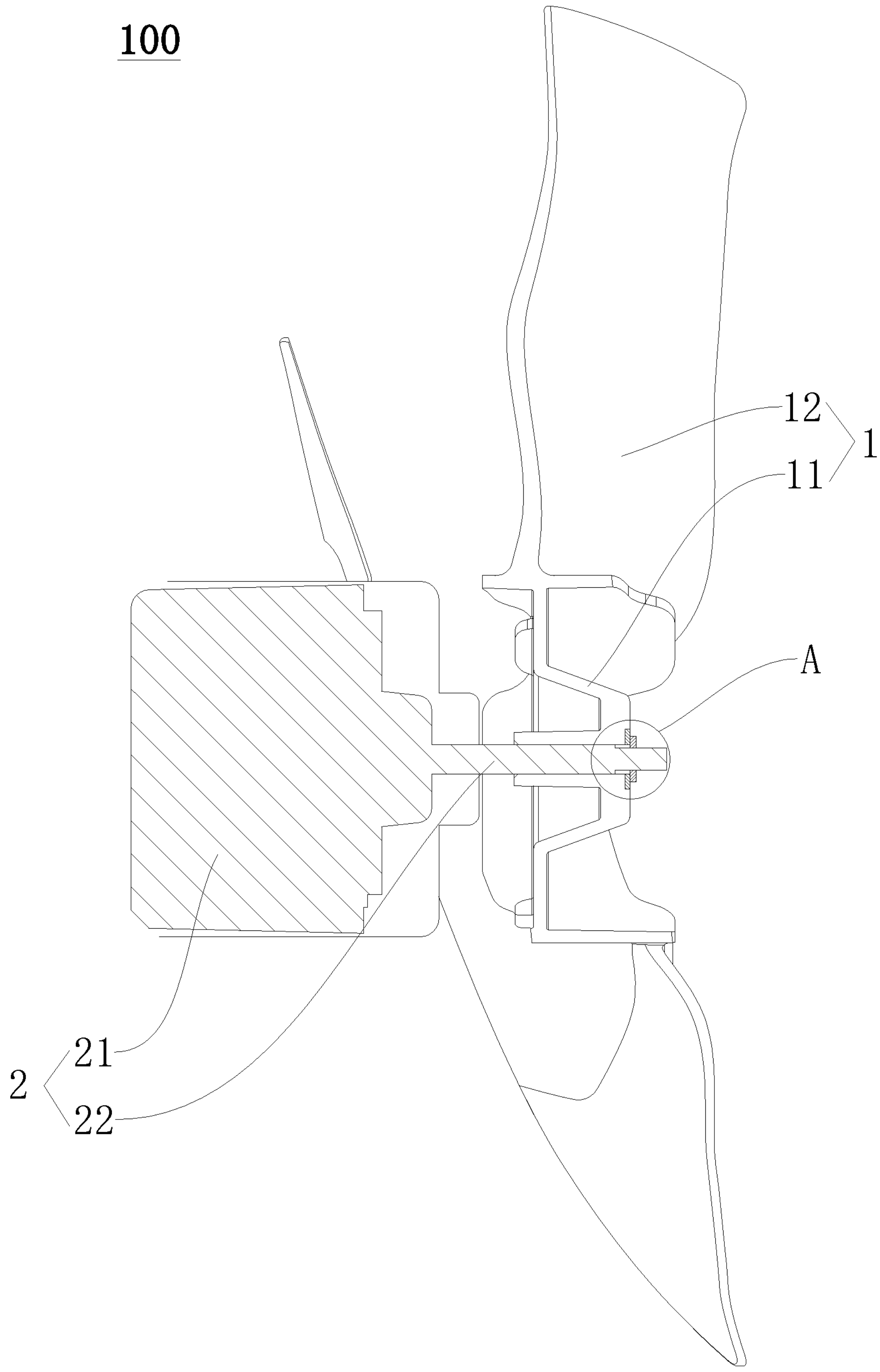
FIG. 2 is a cross-sectional view of an axial flow fan in FIG. 1.

Referring to FIG. 1 and FIG. 2, the axial flow fan 100 according to embodiments in a first aspect of the present disclosure includes an axial flow impeller 1, a motor 2 configured to drive the axial flow impeller 1 to rotate, and a resistance member 3. The axial flow impeller 1 includes a hub 11, and blades 12 arranged at an outer peripheral wall of the hub 11. A plurality of (two or more) blades 12 may be provided. The plurality of blades 12 may be arranged along a circumferential direction of the hub 11 and spaced apart from each other. A shaft hole is formed in the hub 11. The motor 2 includes a motor body 21, and a motor shaft 22 connected to the motor body 21. The motor shaft 22 is engaged in the shaft hole, such that the motor 2 can drive the axial flow impeller 1 to rotate.

During the operation of the axial flow impeller 1, the motor 2 works and drives the axial flow impeller 1 to rotate, enabling the axial flow fan 100 to generate axial airflow.

The resistance member 3 is arranged at the hub 11 and close to a free end 221 of the motor shaft 22, and a stiffness of the resistance member 3 is greater than a stiffness of the hub 11. By providing the resistance member 3 having a greater stiffness, an end of the axial flow fan 100 facing away from the motor body 21 can have an improved structural stability, and an overall stiffness of the axial flow impeller 1 is improved, thereby increasing an acting force of the axial flow impeller 1 against an unbalanced force. When the hub 11 transmits an unbalanced excitation to the motor shaft 22, due to the improved structural stability, unbalanced vibrations caused by the unbalanced excitation acting on the hub 11 are reduced, and thus, the hub 11 will transmit less unbalanced excitation to the motor shaft 22. In this way, the unbalanced excitation acting on the motor can be reduced, and the abnormal motor noise caused by the unbalanced excitation can be lowered.

In the axial flow fan according to the present disclosure, by arranging the resistance member 3 on the hub 11 and close to the free end 221 of the motor shaft 22, and setting the stiffness of the resistance member 3 to be greater than the stiffness of the hub 11, the overall stiffness of the axial flow impeller 1 is increased, such that the acting force of the axial flow impeller 1 against the unbalanced force is increased, and the unbalanced excitation acting on the motor shaft 22 is reduced, thereby lowering the noise generated by the axial flow fan 100 during the operation.

Figure 3:
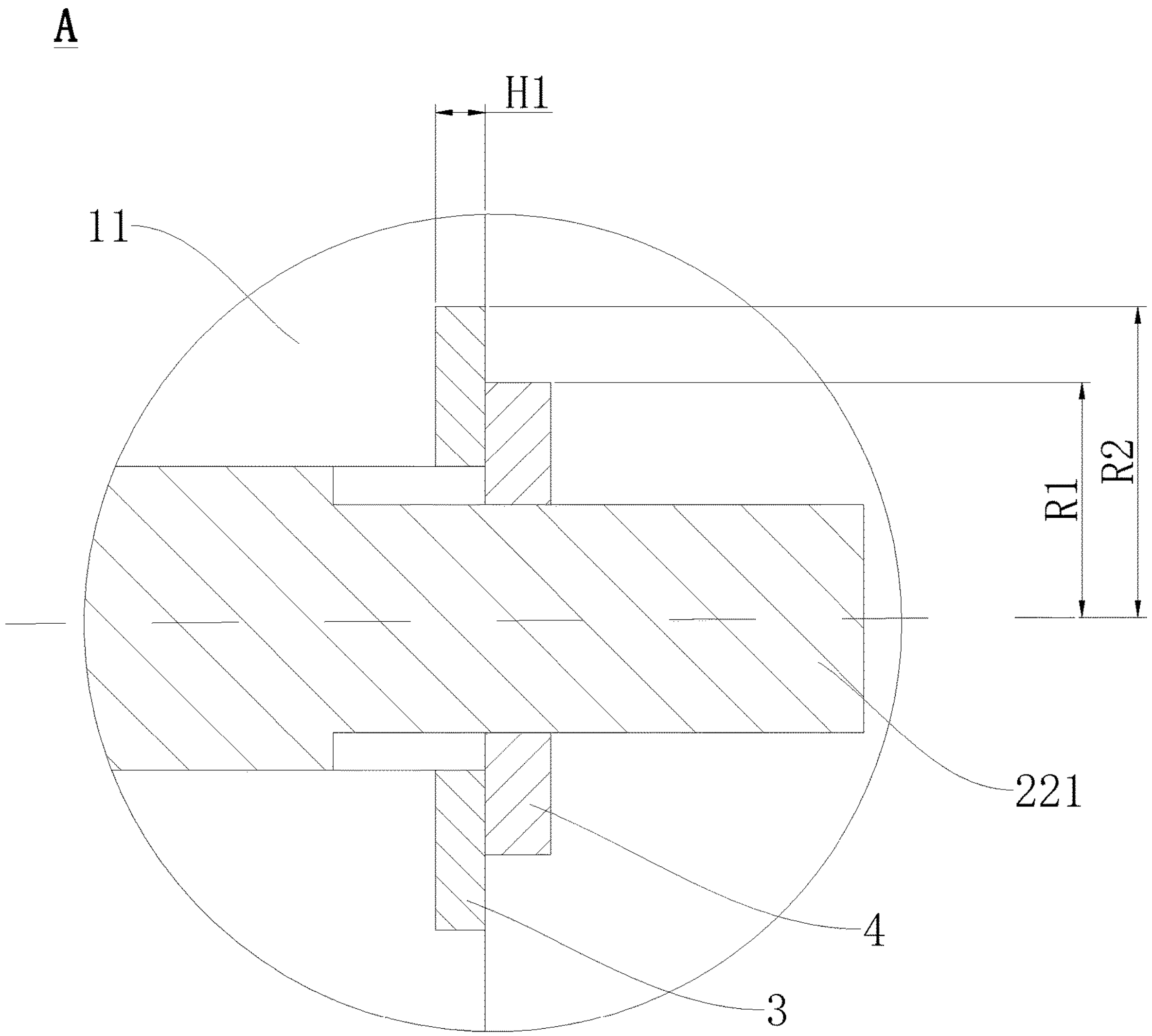
FIG. 3 is an enlarged view of part A in FIG. 2.

Referring to FIG. 2 and FIG. 3, according to some embodiments of the present disclosure, since the stiffness of the resistance member 3 is greater than the stiffness of the motor shaft 22, the structural stability of the end of the axial flow fan 100 facing away from the motor body 21 can be advantageously improved to reduce the unbalanced excitation acting on the motor shaft 22.

Referring to FIG. 3, according to some embodiments of the present disclosure, the resistance member 3 is a metallic member or a ceramic member. In this case, the resistance member 3 can have a relatively great stiffness and a good structural strength and can be fabricated easily.

Referring to FIG. 3, according to some embodiments of the present disclosure, the stiffness of the resistance member 3 ranges from $0.8\times10^7$ N/m to $1.5\times10^7$ N/m. A stiffness of the resistance member 3 outside the above range is not conducive to reducing the unbalanced excitation acting on the motor shaft 22, and the connection between the hub 11, the motor shaft 22, and the resistance member 3 is unstable. By limiting the stiffness of the resistance member 3 to be within an appropriate range, the unbalanced excitation acting on the motor shaft 22 can be effectively reduced, and the hub 11, the motor shaft 22, and the resistance member 3 can be connected in a stable manner. For example, the stiffness of the resistance member 3 has a value of $1\times10^7$ N/m.

Referring to FIG. 2 and FIG. 3, according to some embodiments of the present disclosure, the resistance member 3 is annular and sleeved on an outer peripheral side of the motor shaft 22. The structure of the resistance member 3 is simple and uniform. In this way, it can be avoided that new unbalanced excitation is generated by an ununiform resistance member 3 during the operation of the axial flow fan 100. Further, in cooperation with the resistance member 3 having the uniform structure, the axial flow impeller 1 can have the enhanced acting force against the unbalanced force. Thus, the unbalanced excitation acting on the motor shaft 22 is reduced, and the resistance member 3 and the motor shaft 22 are provided with a relatively high connection strength.

Further, referring to FIG. 3, an annular mounting groove is formed in an inner peripheral wall of the shaft hole, and the resistance member 3 is accommodated in the mounting groove. The mounting groove can fix a position of the resistance member 3 and facilitate the mounting and fixation of the resistance member 3, thereby providing the resistance member 3 and the hub 11 with a relatively high connection strength.

Further, referring to FIG. 3, along an axial direction, the mounting groove penetrates an end surface of the hub 11 close to the free end 221 of the motor shaft 22, which facilitates processing of the mounting groove and also facilitates mounting and replacement of the resistance member 3. When the axial flow impeller 1 rotates in an unbalanced state, an end of the axial flow impeller 1 close to the free end 221 is subjected to the greatest unbalanced force. In this case, by forming the mounting groove close to the free end 221, the resistance member 3 can be disposed at a position close to the free end 221, thereby enhancing the overall stiffness of the end of the axial flow impeller 1 close to the free end 221, and increasing the acting force of the axial flow impeller 1 against the unbalanced force. In this way, the unbalanced excitation acting on the motor shaft 22 can be significantly reduced.

Referring to FIG. 3, optionally, an end surface of the resistance member 3 close to the free end 221 of the motor shaft 22 is flush with the end surface of the hub 11 close to the free end 221 of the motor shaft 22, to provide a sufficient contact area between the resistance member 3 and the hub 11 for guaranteeing a stable connection between the resistance member 3 and the hub 11. Thus, the acting force of the axial flow impeller 1 against the unbalanced force can be increased, and an appearance of a product can be beautified.

Referring to FIG. 1, FIG. 2 and FIG. 3, optionally, the axial flow fan 100 includes a locknut 4 engaged with the free end 221 of the motor shaft 22 through threads, such that the locknut 4 and the motor shaft 22 can be relatively fixed. The locknut 4 is arranged at a side of the resistance member 3 close to the free end 221 of the motor shaft 22 and abuts against the resistance member 3. Due to a position-limiting effect of the mounting groove, the resistance member 3 can be fixed along the axial direction of the motor shaft 22. When the locknut 4 is screwed, the locknut 4 can provide an axial force to the resistance member 3 and the hub 11. The axial force acts on a surface of the hub 11 along the axial direction. When the axial flow impeller 1 is subjected to the unbalanced excitation, due to the presence of the axial force, the unbalanced vibrations can be reduced and the unbalanced excitation received by the motor shaft 22 can be lowered, thereby reducing the vibrations and noise of the motor 2 caused by the unbalance of the motor shaft 22.

Referring to FIG. 3, optionally, the resistance member 3 and the locknut 4 are formed in one piece. In this case, the resistance member 3 and the locknut 4 can have a higher connection strength, and assembly procedures can be reduced.

Referring to FIG. 3, optionally, a projection of the locknut 4 on a reference surface is a first projection, a projection of the resistance member 3 on the reference surface is a second projection, an outer contour of the first projection is located within an outer contour of the second projection. For example, when the projection of the locknut 4 on the reference surface and the projection of the resistance member 3 on the reference surface are both annular, an outer ring of the projection of the resistance member 3 has a greater radius than an outer ring of the projection of the locknut 4, as illustrated in FIG. 3, R2 is greater than R1. The reference surface is perpendicular to a central axis of the motor shaft 22. In this way, a contact area between the resistance member 3 and the locknut 4 can be sufficient to ensure that the resistance member 3 is subjected to a uniform and stable force, thereby reducing the unbalanced force received by the hub 11. Meanwhile, the inconvenience in cleaning the accumulated dust, which may be occur when the locknut 4 and the hub 11 are suspended, can be avoided.

Referring to FIG. 3, optionally, an inner peripheral wall of the resistance member 3 is spaced apart from an outer peripheral wall of the motor shaft 22 to reduce a direct transmission of the unbalanced excitation from the hub 11 to the motor shaft 22, thereby reducing the unbalanced excitation acting on the motor shaft 22.

Referring to FIG. 3, optionally, a length H1 of the resistance member 3 along the axial direction of the motor shaft 22 ranges from 3 mm to 6 mm. If H1 is too small, it is not conducive for the resistance member 3 to effectively improve an overall stiffness of the axial flow fan 100. If H1 is too great, the cost of resistance member 3 is too high. By limiting H1 within the appropriate range, the resistance member 3 can effectively improve the overall stiffness of the axial flow fan 100 while reducing the cost of the resistance member 3. For example, H1 can be 4 mm.

Referring to FIG. 3, according to some embodiments of the present disclosure, the resistance member 3 is embedded in the hub 11 through injection molding. In this case, the resistance member 3 and the hub 11 can be relatively fixed and have a high connection strength, which is beneficial to reduce the unbalanced vibrations caused by the unbalanced excitation of the hub 11.

Referring to FIG. 1, an air conditioner outdoor unit according to embodiments in a second aspect of the present disclosure includes the axial flow fan 100 according to the embodiments in the first aspect of the present disclosure. During the operation of the air conditioner outdoor unit, since the noise generated by the axial flow fan 100 is reduced, the noise generated by the air conditioner outdoor unit is reduced.

In the air conditioner outdoor unit of the present disclosure, by providing the above-mentioned axial flow fan 100, the noise generated during the operation of the air conditioner outdoor unit is relatively low.

An air conditioner according to embodiments in a third aspect of the present disclosure includes an air conditioning indoor unit, and the air conditioner outdoor unit according to the embodiments in the second aspect of the present disclosure. The air conditioner may be a split wall-mounted air conditioner or a split floor-standing air conditioner.

In the air conditioner according to the present disclosure, by providing the above-mentioned air conditioner outdoor unit, the noise generated during the operation of the air conditioner is relatively low.

The axial flow fan 100 according to other embodiments of the present disclosure is described below with reference to FIG. 4 to FIG. 7.

Figure 4:
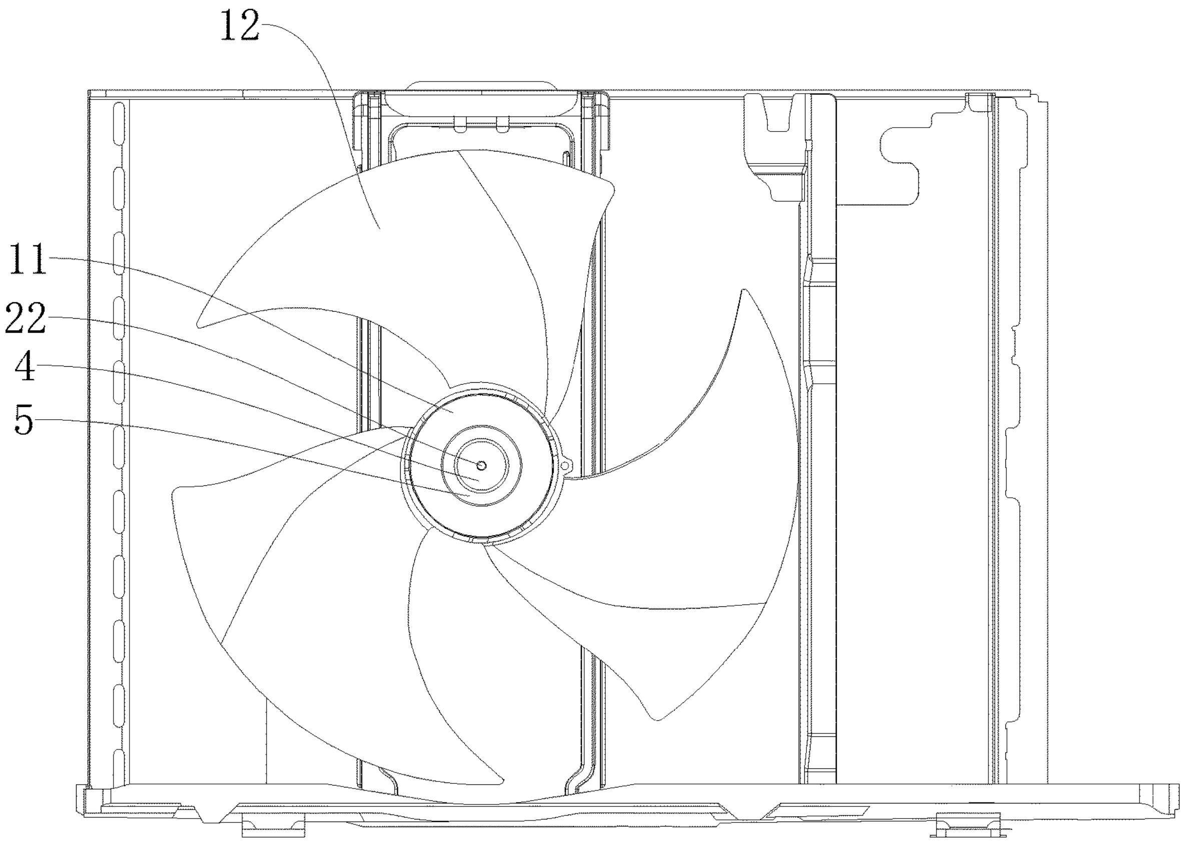
FIG. 4 is a partial structural diagram of an air conditioner outdoor unit according to other embodiments of the present disclosure.
Figure 5:
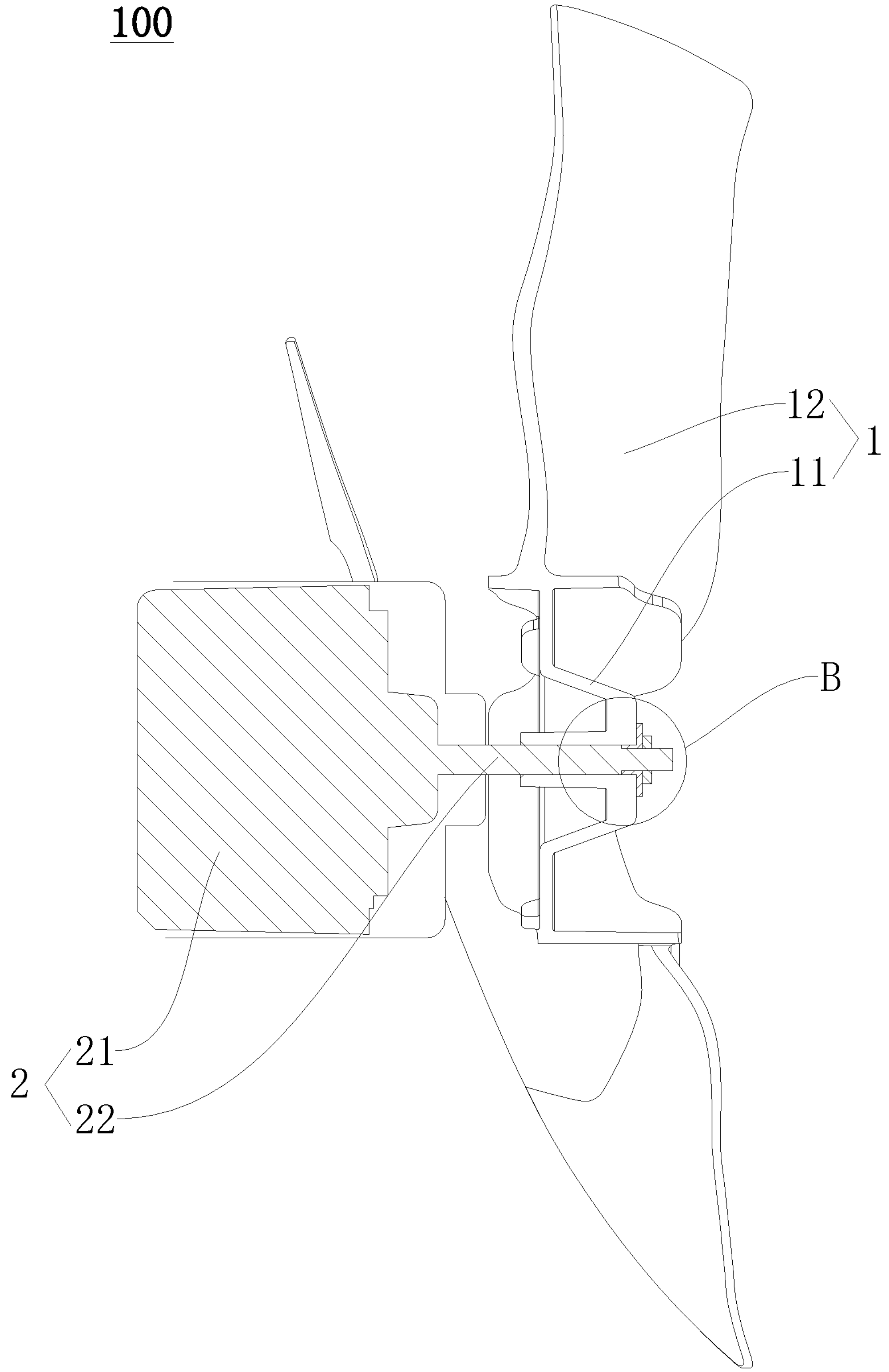
FIG. 5 is a cross-sectional view of an axial flow fan in FIG. 4.

Referring to FIG. 4 and FIG. 5, the axial flow fan 100 according to embodiments in a fourth aspect of the present disclosure includes an axial flow impeller 1, a motor 2 configured to drive the axial flow impeller 1 to rotate, and an elastic buffering member 5. The axial flow impeller 1 includes a hub 11 and blades 12 arranged at an outer peripheral wall of the hub 11. A plurality of (two or more) blades 12 may be provided. The plurality of blades 12 may be arranged along a circumferential direction of the hub 11 and spaced apart from each other. A shaft hole is formed in the hub 11. The motor 2 includes a motor body 21 and a motor shaft 22 connected to the motor body 21. The motor shaft 22 is engaged in the shaft hole, such that the motor 2 can drive the axial flow impeller 1 to rotate.

During the operation of the axial flow fan 100, the motor 2 works and drives the axial flow impeller 1 to rotate, enabling the axial flow fan 100 generates axial airflow. During the rotation of the axial flow impeller 1, the blades 12 are subjected to great resistance due to the low weight thereof. Thus, the blades 12 are subjected to unbalanced excitation and transmit the unbalanced excitation to the hub 11. A relative displacement between the hub 11 and the motor shaft 22 occurs under an influence of the unbalanced excitation, and the unbalanced excitation is transmitted to the motor shaft 22.

The elastic buffering member 5 is arranged at the motor shaft 22. At least a part of the elastic buffering member 5 is located between the outer peripheral wall of the motor shaft 22 and the inner peripheral wall of the shaft hole. The part of the elastic buffering member 5 located between the outer peripheral wall of the motor shaft 22 and the inner peripheral wall of the shaft hole is elastically deformable along a radial direction of the motor shaft 22. Through an elastic deformation of the elastic buffering member 5 located between the hub 11 and the motor shaft 22, the relative displacement between the hub 11 and the motor shaft 22 can be reduced. Since the elastic buffering member 5 can absorb a part of the unbalanced excitation, the unbalanced excitation transmitted from the hub 11 to the motor shaft 22 can be reduced. Accordingly, the unbalanced excitation acting on the motor shaft 22 can be reduced, thereby lowering the noise generated by the motor 2. For example, a part of the elastic buffering member 5 may be located between the outer peripheral wall of the motor shaft 22 and the inner peripheral wall of the shaft hole, or the entire elastic buffering member 5 may be located between the outer peripheral wall of the motor shaft 22 and the inner peripheral wall of the shaft hole.

In the axial flow fan 100 according to the present disclosure, due to the presence of the elastic buffering member 5 and the elastic deformation of the part of the elastic buffering member 5 located between the outer peripheral wall of the motor shaft 22 and the inner peripheral wall of the shaft hole along the radial direction of the motor shaft 22, the relative displacement between the hub 11 and the motor shaft 22 can be reduced, and the elastic buffering member 5 can absorb a part of the unbalanced excitation, such that the unbalanced excitation acting on the motor shaft 22 can be reduced, thereby lowering the noise generated during the operation of the axial flow fan 100.

Figure 6:
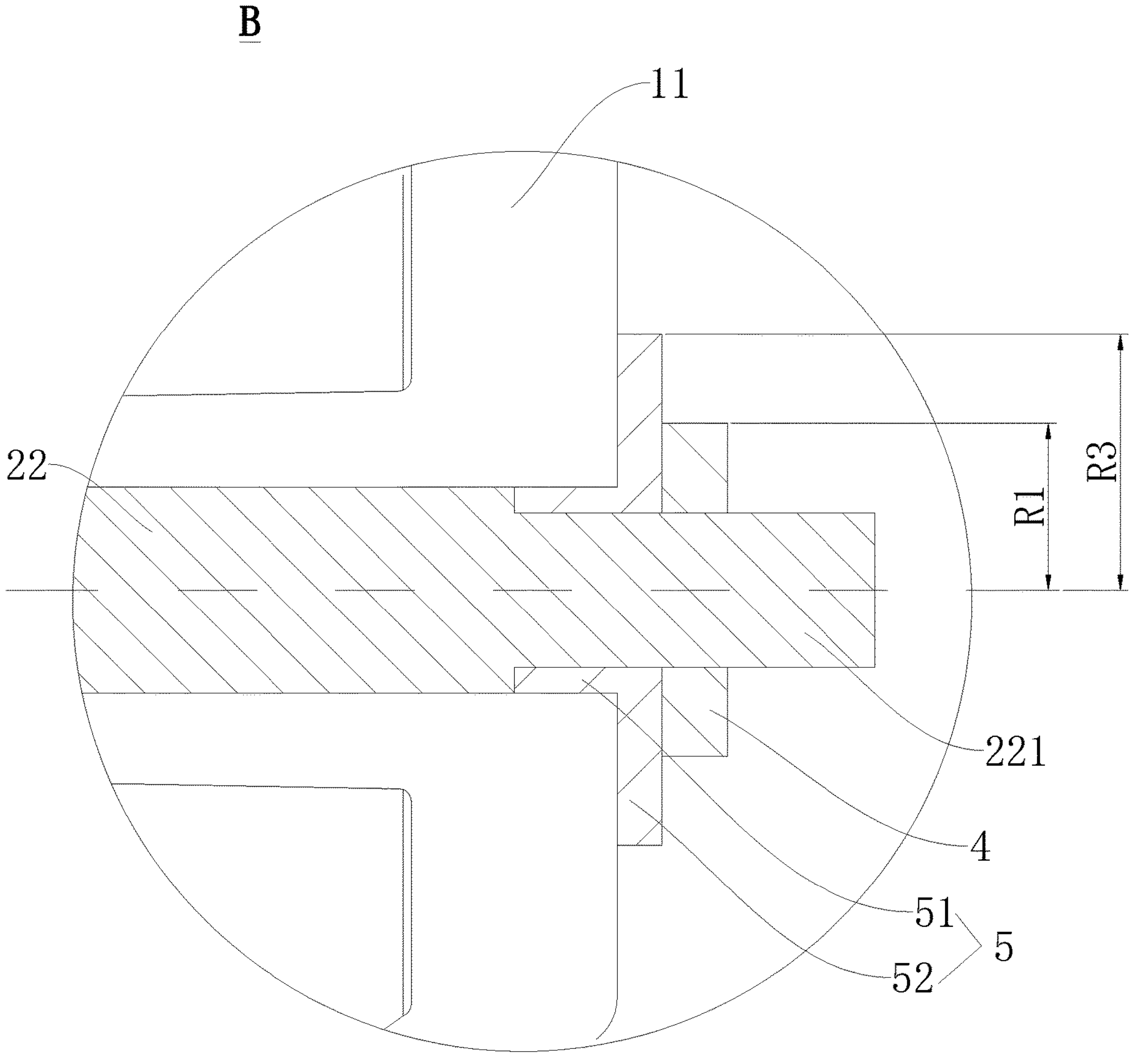
FIG. 6 is an enlarged view of part B in FIG. 5.

Referring to FIG. 6, according to some embodiments of the present disclosure, the elastic buffering member 5 is close to a free end 221 of the motor shaft 22. When the axial flow impeller 1 in an unbalanced state rotates, the free end 221 is subjected to the greatest unbalanced excitation. Thus, by arranging the elastic buffering member 5 close to the free end 221 of the motor shaft 22, the unbalanced excitation acting on the motor shaft 22 can be advantageously reduced to a great extent.

Referring to FIG. 5 and FIG. 6, according to some optional embodiments of the present disclosure, the elastic buffering member 5 includes a first buffer 51 in a cylindrical shape. The first buffer 51 is sleeved on the motor shaft 22 to enable the first buffer 51 to have a uniform structure, preventing new unbalanced excitation from being generated by the non-uniform first buffer 51 during the operation of the axial flow fan 100. In addition, by positioning at least a part of the first buffer 51 between the outer peripheral wall of the motor shaft 22 and the inner peripheral wall of the shaft hole, the elastic buffering member 5 can have a simple structure and can be easily fabricated, and the elastic buffering member 5 can reduce the unbalanced excitation acting on the motor shaft 22 in a circumferential direction of the motor shaft 22. For example, a part of the first buffer 51 may be located between the outer peripheral wall of the motor shaft 22 and the inner peripheral wall of the shaft hole, or the entire first buffer 51 may be located between the outer peripheral wall of the motor shaft 22 and the inner peripheral wall of the shaft hole.

Figure 7:
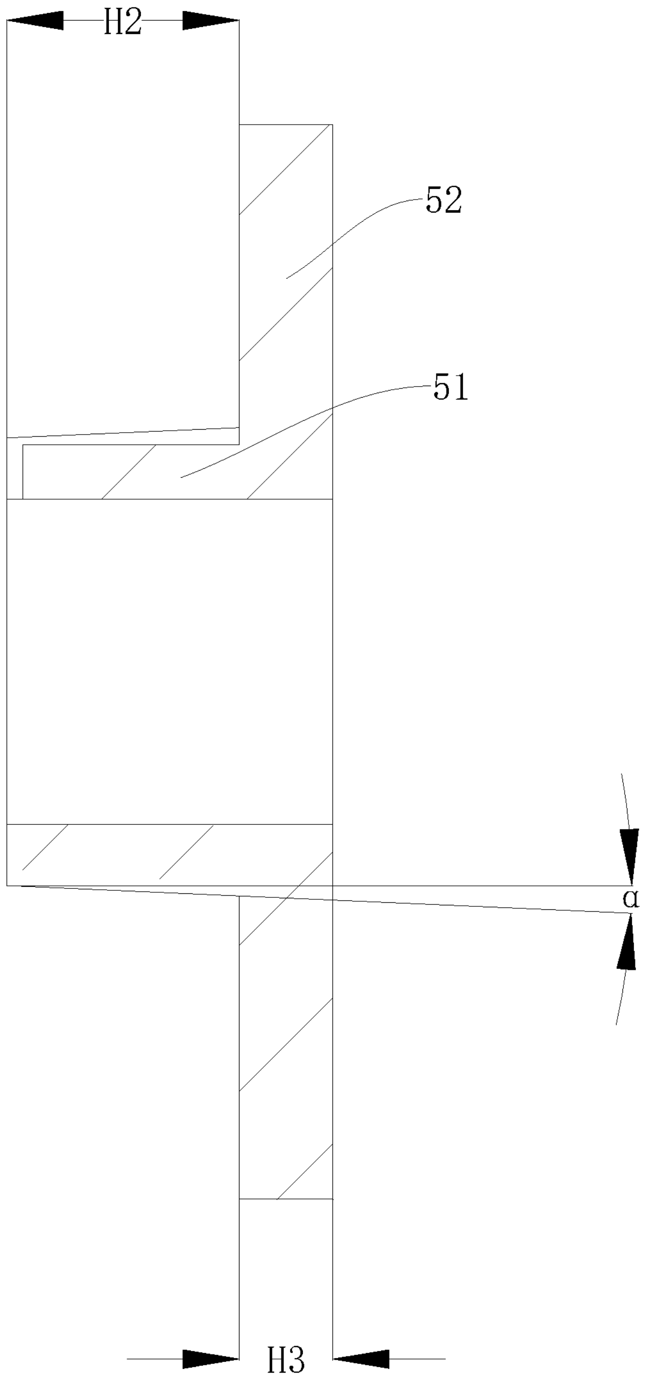
FIG. 7 is a cross-sectional view of an elastic buffering member in FIG. 5.

Referring to FIG. 5, FIG. 6, and FIG. 7, optionally, an accommodation chamber configured to accommodate the first buffer 51 is formed between the outer peripheral wall of the motor shaft 22 and the inner peripheral wall of the shaft hole, and an end side of the accommodation chamber close to the free end 221 of the motor shaft 22 is open. Therefore, by forming the accommodation chamber between the outer peripheral wall of the motor shaft 22 and the inner peripheral wall of the shaft hole, the first buffer 51 can be conveniently mounted and fixed between the outer peripheral wall of the motor shaft 22 and the inner peripheral wall of the shaft hole, and by providing the open end side of the accommodation chamber close to the free end 221 of the motor shaft 22, the first buffer 51 of the elastic buffering member 5 can be conveniently inserted into the accommodation chamber from the open end side of the accommodation chamber.

Referring to FIG. 7, further, a radial thickness of the first buffer 51 gradually decreases along a direction from the free end 221 of the motor shaft 22 to the motor body 21, which facilitates an insertion of the first buffer 51 into the accommodation chamber, and allows the first buffer 51 to be in interference fit with the accommodation chamber. In this way, the stability of a connection of the motor shaft 22, the elastic buffering member 5, and the hub 11 can be improved, and the unbalanced excitation can be advantageously absorbed by the first buffer 51.

Specifically, an inner peripheral surface of the first buffer 51 extends along the axial direction of the motor shaft 22. Along a direction from the motor body 21 to the free end 221 of the motor shaft 22, an outer peripheral surface of the first buffer 51 extends obliquely in a direction facing away from the motor shaft 22, which facilitates the interference fit between the first buffer 51 and the accommodation chamber, and reduces the difficulty in processing the first buffer 51.

Referring to FIG. 7, further, a slope M of the outer peripheral surface of the first buffer 51 ranges from $1/11$ to $1/8$. With reference to FIG. 7, the slope M is a tangent value of an included angle $\alpha$ between an outer peripheral wall of the first buffer 51 facing away from the motor shaft 22 and an inner peripheral wall of the first buffer adjacent to the motor shaft 22. If the slope M is too small, the interference fit between the first buffer 51 and the accommodation chamber may not be tight enough. If the slope M is too great, it is difficult to insert the first buffer 51 into the accommodation chamber, resulting in difficulty in assembly. By limiting the slope M within the appropriate range, the first buffer 51 and the accommodation chamber can be conveniently assembled, while ensuring an effective interference fit between the first buffer 51 and the accommodation chamber. For example, the slope M may be $1/10$.

Referring to FIG. 5 and FIG. 6, according to some optional embodiments of the present disclosure, an end of the first buffer 51 facing away from the motor body 21 extends to the outside of the shaft hole along the axial direction of the motor shaft 22, thereby ensuring a sufficient contact area between the first buffer 51 and the hub 11 as well as a sufficient contact area between the first buffer 51 and the motor shaft 22. In this way, the first buffer 51 can normally absorb the unbalanced excitation exerted by the hub 11 on the motor shaft 22. Also, an assembly of the first buffer 51 and the accommodation chamber can be facilitated, such that the first buffer 51 can be easily removed when the first buffer 51 needs to be replaced and cleaned.

Referring to FIG. 5, FIG. 6, and FIG. 7, according to some optional embodiments of the present disclosure, the elastic buffering member 5 further includes a second buffer 52. The second buffer 52 is formed at an end of the first buffer 51 facing away from the motor body 21. The second buffer 52 is connected to the outer peripheral wall of the first buffer 51 and extends along a circumferential direction of the first buffer 51. The second buffer 52 is also connected to or abuts against the hub 11, thereby increasing a contact area between the elastic buffering member 5 and the hub 11 as well as a contact area between the elastic buffering member 5 and the motor shaft 22, and improving a connection strength of the elastic buffering member 5, the hub 11, and the motor shaft 22.

Referring to FIG. 4, FIG. 5, and FIG. 6, optionally, the axial flow fan includes a locknut 4 engaged with the free end 221 of the motor shaft 22 through threads, such that the locknut 4 and the motor shaft 22 can be relatively fixed. The locknut 4 presses the second buffer 52 on the hub 11, such that the locknut 4, the second buffer 52, and the hub 11 can be connected to each other in a stable manner. When the locknut 4 is locked, the axial surface of the hub 11 is subjected to the axial force. When the hub 11 is subjected to the unbalanced excitation, due to the presence of the axial force, the unbalanced excitation received by the hub 11 is reduced, and thus the unbalanced excitation transmitted to the motor shaft 22 is reduced.

Referring to FIG. 4, FIG. 5, and FIG. 6, further, a projection of the locknut 4 on a reference surface is located within a projection of the second buffer 52 on the reference surface. For example, when the projection of the locknut 4 on the reference surface and the projection of the second buffer 52 on the reference surface are both annular, a radius of an outer ring of the projection of the second buffer 52 is greater than a radius of an outer ring of the projection of the locknut 4, as illustrated in FIG. 6, R3 is greater than R1. The reference surface is perpendicular to the central axis of the motor shaft 22. In this way, the second buffer 52 can have a larger area on the reference surface, which is beneficial for the second buffer 52 to absorb the unbalanced excitation. Meanwhile, the inconvenience in cleaning the accumulated dust, which may be occur when the locknut 4 and the hub 11 are suspended, can be avoided.

Referring to FIG. 7, optionally, a ratio of an axial length H2 of the first buffer 51 to an axial length H3 of the second buffer 52 ranges from 2 to 5. If the ratio of the axial length H2 of the first buffer 51 to the axial length H3 of the second buffer 52 is too small, then either H2 is too small, which causes the performance of the first buffer to absorb the unbalanced excitation to be reduced and the connection strength between the first buffer 51 and the receiving groove to be too weak, or H3 is too great, which may increase the cost of the second buffer 52 and affect an appearance thereof. If the ratio of the axial length H2 of the first buffer 51 to the axial length H3 of the second buffer 52 is too great, then either H2 is too great, which makes it difficult to mount the first buffer 51 in the accommodating groove, or H3 is too small, which reduces the performance of the second buffer 52 to absorb the unbalanced excitation. By limiting the ratio of the axial length H2 of the first buffer 51 to the axial length H3 of the second buffer 52 within the appropriate range, the elastic buffering member 5 can have good performance in absorbing the unbalanced excitation, and the elastic buffering member 5 and accommodating groove can be easily fabricated or formed. For example, the ratio of the axial length H2 of the first buffer 51 to the axial length H3 of the second buffer 52 may be 3.

Referring to FIG. 7, optionally, the axial length H3 of the second buffer 52 ranges from 5 mm to 8 mm. If H3 is too small, the performance of the second buffer 52 to absorb the unbalanced excitation is reduced. If H3 is too great, the cost of the second buffer 52 is too high and the appearance thereof is affected. By limiting H3 within the appropriate range, the cost of the second buffer 52 can be reduced and the product can be beautified while ensuring that the second buffer 52 normally absorbs the unbalanced excitation. For example, H3 may be 6 mm.

Referring to FIG. 1 to FIG. 4, according to some embodiments of the present disclosure, the elastic buffering member 5 is a rubber member or a plastic member, such that the elastic buffering member 5 may have satisfying elasticity and wear resistance.

Referring to FIG. 4 to FIG. 7, optionally, the elastic buffering member 5 has hardness ranging from 30HRC to 35HRC. If the hardness of the elastic buffering member 5 is too great, the elastic buffering member 5 has poor elasticity. If the hardness of the elastic buffering member 5 is too small, a structural strength of the elastic buffering member 5 is too low. By limiting the hardness of the elastic buffering member 5 within the appropriate range, the elastic buffering member 5 can have good elasticity and structural strength. For example, the hardness of the elastic buffering member 5 is 33HRC.

Referring to FIG. 4, an air conditioner outdoor unit according to embodiments in a fifth aspect of the present disclosure includes the axial flow fan 100 according to the embodiments in the fourth aspect of the present disclosure. During the operation of the air conditioner outdoor unit, since the noise generated by the axial flow fan 100 is reduced, the noise generated by the air conditioner outdoor unit is reduced.

In the air conditioner outdoor unit of the present disclosure, by providing the axial flow fan 100, the noise generated during the operation of the air conditioner outdoor unit is relatively low.

An air conditioner according to embodiments in a sixth aspect of the present disclosure includes an air conditioning indoor unit and the air conditioner outdoor unit according to the embodiments in the fifth aspect of the present disclosure. The air conditioner may be a split wall-mounted air conditioner or a split floor-standing air conditioner.

According to the air conditioner of the present disclosure, by providing the above-mentioned air conditioner outdoor unit, the noise generated during the operation of the air conditioner is relatively low.

Throughout this specification, description with reference to "an embodiment," "some embodiments," "an illustrative embodiment," "an example," "a specific example," or "some examples" means that a particular feature, structure, material, or characteristic described in connection with the embodiment or example is included in at least one embodiment or example of the present disclosure. The appearances of the above phrases throughout this specification are not necessarily referring to the same embodiment or example of the present disclosure. Furthermore, the particular features, structures, materials, or characteristics described here may be combined in any suitable manner in one or more embodiments or examples.

Although the embodiments of the present disclosure have been illustrated and described, it should be understood by those skilled in the art that various changes, modifications, alternatives, and modifications can be made to the embodiments without departing from principles and the spirit of the present disclosure. The scope of the invention is defined by the attached claims and their equivalents.

What is claimed is:

1. An axial flow fan comprising:

an axial flow impeller including:

a hub having a shaft hole; and blades arranged at an outer peripheral wall of the hub;

a motor configured to drive the axial flow impeller to rotate, and including:

a motor body; and a motor shaft connected to the motor body and engaged in the shaft hole; and a resistance member arranged at the hub and closer to a free end of the motor shaft than to an end of the motor shaft connecting to the motor body, a stiffness of the resistance member being greater than a stiffness of the hub, an inner peripheral wall of the entire resistance member is spaced apart from an outer peripheral wall of the motor shaft.

2. The axial flow fan according to claim 1, wherein the stiffness of the resistance member is greater than a stiffness of the motor shaft.

3. The axial flow fan according to claim 1, wherein the resistance member includes a metallic member or a ceramic member.

4. The axial flow fan according to claim 1, wherein the stiffness of the resistance member is in a range from 0.8×107 N/m to 1.5×107 N/m.

5. The axial flow fan according to claim 1, wherein the resistance member is annular and sleeved on an outer peripheral side of the motor shaft.

6. The axial flow fan according to claim 5, wherein an annular mounting groove is formed in an inner peripheral wall of the shaft hole, and the resistance member is accommodated in the annular mounting groove.

7. The axial flow fan according to claim 6, wherein the annular mounting groove penetrates an end surface of the hub closer to the free end of the motor shaft than to the end of the motor shaft connecting to the motor body along an axial direction.

8. The axial flow fan according to claim 7, wherein an end surface of the resistance member is flush with the end surface of the hub.

9. The axial flow fan according to claim 1, further comprising: a locknut connected to the free end of the motor shaft through threads, the locknut abutting against the resistance member.

10. The axial flow fan according to claim 9, wherein the resistance member and the locknut are formed in one piece.

11. The axial flow fan according to claim 9, wherein an outer contour of a projection of the locknut on a reference surface perpendicular to a central axis of the motor shaft is located within an outer contour of a projection of the resistance member on the reference surface.

12. The axial flow fan according to claim 1, wherein a length of the resistance member in an axial direction of the motor shaft is in a range from 3 mm to 6 mm.

13. The axial flow fan according to claim 1, wherein the resistance member is embedded in the hub through injection molding.

14. The axial flow fan according to claim 1, wherein a first surface of the resistance member that is perpendicular to a central axis of the motor shaft is coplanar with a second surface of the hub that is perpendicular to the central axis of the motor shaft and closest to the free end of the motor shaft among all surfaces of the hub, and a distance between the second surface and the free end being greater than zero.

15. An air conditioner outdoor unit comprising:

an axial flow fan including:

an axial flow impeller including:

a hub having a shaft hole; and blades arranged at an outer peripheral wall of the hub;

a motor configured to drive the axial flow impeller to rotate, and including:

a motor body; and a motor shaft connected to the motor body and engaged in the shaft hole; and a resistance member arranged at the hub and closer to a free end of the motor shaft than to an end of the motor shaft connecting to the motor body, a stiffness of the resistance member being greater than a stiffness of the hub, an inner peripheral wall of the entire resistance member is spaced apart from an outer peripheral wall of the motor shaft.

16. An air conditioner comprising:

an air conditioning indoor unit; and an air conditioner outdoor unit including an axial flow fan including:

an axial flow impeller including:

a hub having a shaft hole; and blades arranged at an outer peripheral wall of the hub;

a motor configured to drive the axial flow impeller to rotate, and including:

a motor body; and a motor shaft connected to the motor body and engaged in the shaft hole; and a resistance member arranged at the hub and closer to a free end of the motor shaft than to an end of the motor shaft connecting to the motor body, a stiffness of the resistance member being greater than a stiffness of the hub, an inner peripheral wall of the entire resistance member is spaced apart from an outer peripheral wall of the motor shaft.

17. The air conditioner according to claim 16, wherein the stiffness of the resistance member is greater than a stiffness of the motor shaft.

18. The air conditioner according to claim 16, wherein the resistance member includes a metallic member or a ceramic member.

19. The air conditioner according to claim 16, wherein the stiffness of the resistance member is in a range from 0.8×107 N/m to 1.5×107 N/m.

20. The air conditioner according to claim 16, wherein the resistance member is annular and sleeved on an outer peripheral side of the motor shaft.

* * * * *